(12) United States Patent
Freeman

(10) Patent No.: US 10,358,213 B2
(45) Date of Patent: Jul. 23, 2019

(54) UNMANNED AERIAL VEHICLE PROTECTIVE FRAME CONFIGURATION

(71) Applicant: Roger Freeman, Westport, CT (US)

(72) Inventor: Roger Freeman, Westport, CT (US)

(*) Notice: Subject to any disclaimer, the term of this patent is extended or adjusted under 35 U.S.C. 154(b) by 327 days.

(21) Appl. No.: 15/333,081

(22) Filed: Oct. 24, 2016

(65) Prior Publication Data

US 2017/0113800 A1   Apr. 27, 2017

Related U.S. Application Data

(60) Provisional application No. 62/245,585, filed on Oct. 23, 2015.

(51) Int. Cl.
| | |
|---|---|
| *B64D 45/00* | (2006.01) |
| *B64C 39/02* | (2006.01) |
| *B64C 25/52* | (2006.01) |
| *B64C 27/00* | (2006.01) |
| *B64C 27/20* | (2006.01) |
| *B64C 1/16* | (2006.01) |

(52) U.S. Cl.
CPC .............. *B64C 39/024* (2013.01); *B64C 1/16* (2013.01); *B64C 25/52* (2013.01); *B64C 27/001* (2013.01); *B64C 27/20* (2013.01); *B64D 45/00* (2013.01); *B64C 2027/002* (2013.01); *B64C 2201/027* (2013.01); *B64C 2201/042* (2013.01); *B64C 2201/108* (2013.01)

(58) Field of Classification Search
CPC ................ B64C 1/16; B64C 2201/042; B64C 2201/021; B64C 2201/024; B64C 2201/06; B64C 2201/104; B64C 2201/108; B64C 39/024; B64C 39/0033; B64C 2211/00
See application file for complete search history.

(56) References Cited

U.S. PATENT DOCUMENTS

| | | | | |
|---|---|---|---|---|
| 3,081,964 | A * | 3/1963 | Quenzler | B64C 29/0033 244/51 |
| 9,540,121 | B2 * | 1/2017 | Byers | B64C 39/024 |
| 2014/0032034 | A1 * | 1/2014 | Raptopoulos | G08G 5/0069 701/25 |
| 2015/0158587 | A1 * | 6/2015 | Patrick | B64C 39/024 244/137.4 |
| 2015/0316927 | A1 * | 11/2015 | Kim | G03B 15/006 701/2 |
| 2015/0377405 | A1 * | 12/2015 | Down | B64C 39/024 73/865.8 |
| 2016/0001883 | A1 * | 1/2016 | Sanz | B64F 1/02 244/17.23 |
| 2016/0121673 | A1 * | 5/2016 | Hutson | B60F 5/02 244/62 |
| 2016/0122015 | A1 * | 5/2016 | Hutson | B64C 39/024 244/17.23 |
| 2016/0304217 | A1 * | 10/2016 | Fisher | B60L 11/1809 |
| 2017/0053572 | A1 * | 2/2017 | Moore | G09F 15/0075 |

* cited by examiner

*Primary Examiner* — Justin M Benedik
(74) *Attorney, Agent, or Firm* — Ziegler IP Law Group, LLC

(57) ABSTRACT

This disclosure describes a configuration of an unmanned aerial vehicle (UAV) that includes a frame that provides structural support for the UAV, protection from foreign objects that may come into contact with the UAV, and protection from precipitation so that the UAV can be used in a wide range of weather conditions. The UAV may have any number of lifting motors. For example, the UAV may include four lifting motors (also known as a quad-copter).

9 Claims, 19 Drawing Sheets

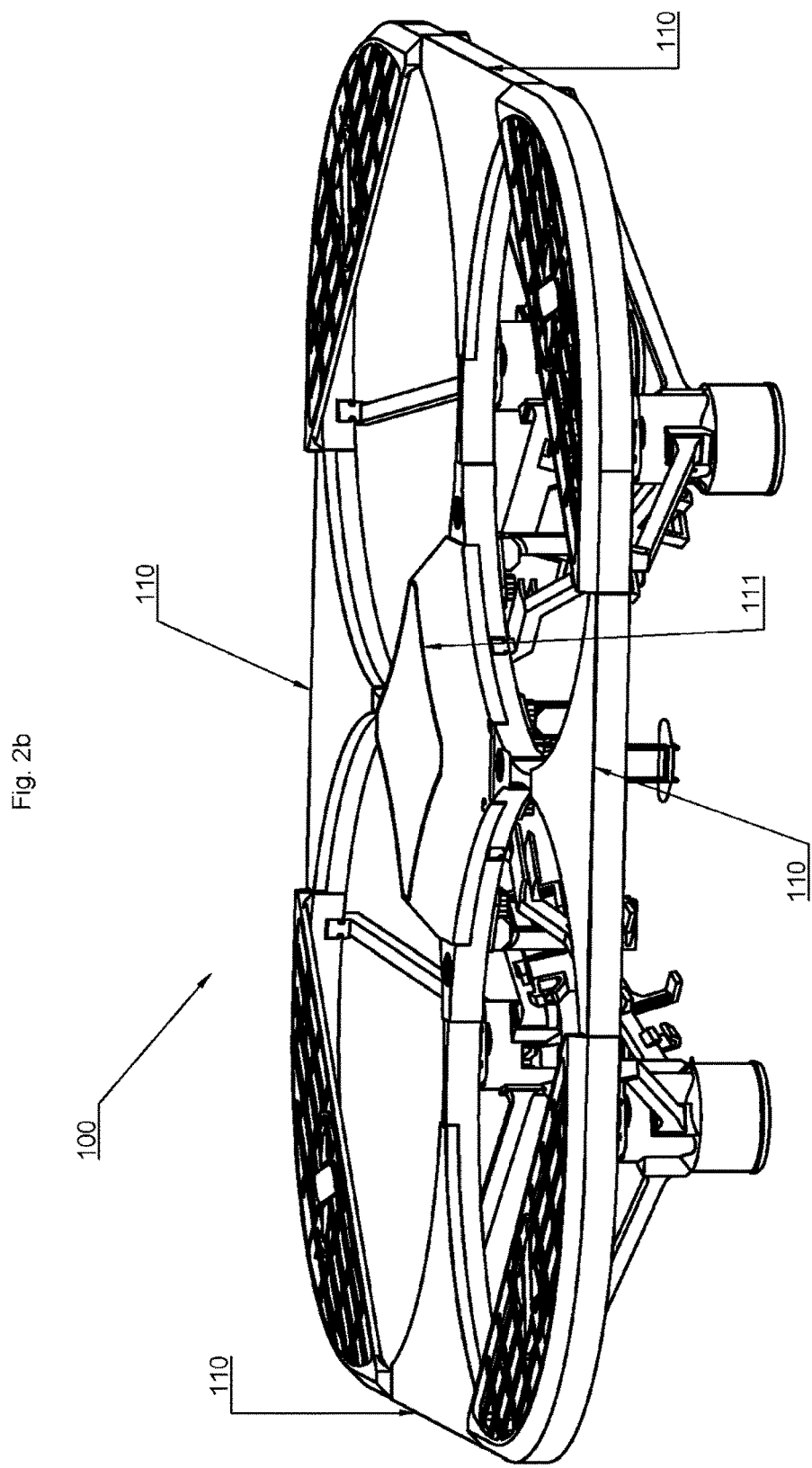

FIG. 8 — Vibration Dampening Motor Sleeve

Threading for Universal Mount

UNMANNED AERIAL VEHICLE PROTECTIVE FRAME CONFIGURATION

CROSS-REFERENCE TO RELATED APPLICATION

This application claims priority to and the benefit of U.S. Provisional Application 62/245,585, filed Oct. 23, 2015, entitled "IMPROVED UNMANNED AERIAL VEHICLE", the disclosure of which is incorporated herein by reference in its entirety.

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc.

FIG. 1 illustrates examples of common multi-copter design types. The typical airframe configurations today consist of "X", "H" and "V" types (FIG. 1) if the UAV has 4 rotors (quad copter). A smaller number of vehicles have 3 (tri-copter), 6 (hex copter) or 8 (octocopter) rotors. Regardless of the number of rotors or configuration type, the designs tend to follow a similar pattern—that is, they consist of a center "plate", with arms projecting out from the center plate that have electric brushless motors mounted at the ends of them. The consumer-oriented vehicles increasingly are manufacturing this configuration (the majority being quad copters, with four rotors) as one body, merging the arms into the center plate in a more curved, visually appealing manner, or encasing the center plate and arms in an outer plastic body. This can be done because the vehicles are small enough that such a design does not detract too much from flight time or cause excessive frame flexing in the air since the motors (with small propellers) are relatively close to the center of the vehicle. But even in these products, the basic design remains unchanged—the center area houses flight electronics (autopilot, remote control receiver, GPS receiver, battery, etc.) with arms protruding out to the motors. The larger multi-copters, weighing 10 pounds or more, are almost exclusively designed using a center plate and rectangular or tubular arms made of lightweight metals or carbon fiber extending out to the motors.

Multi-copter designs are compromised in several areas:

(1) First, with the exception of a handful of very small micro copters, the propeller blades (rotors) are not enclosed. That is, they spin freely, enabling them to come into contact with people, tree branches, and other property (including buildings and vehicles), posing great danger to people and risking damage to property, and almost certainly causing significant damage to the multi-copter itself. Larger multi-copters, with 12 inch+ propellers spinning at RPMs in excess of 10,000, easily pose life-threatening injuries to people.

(2) For the majority of multi-copters, with motors attached to arms protruding from a center plate, the entire weight of the vehicle, as well as inertial forces from the motors and atmospheric environment, has to be carried/absorbed through these specific joints, requiring them to be reinforced. Still, because of weight considerations, there is always a compromise between strength and weight that leaves the arms vulnerable to bending and/or breaking depending on the materials used to manufacture them.

(3) Mounting space for vehicle electronics is mostly limited to the center part of the vehicle due to the lack of available flat surfaces that are sufficiently far from the motors. Not only does this limit the number of devices that can be attached to the vehicle, but also, and most importantly, existing designs make it difficult to separate electronic equipment, particularly radio frequency (RF) electronics, such as remote control, data, and audio/video transmitters and receivers, far enough from one another to consistently prevent interference. This interference can cause loss of vehicle control (or at a minimum reduce remote control, video or wireless data range) or other functions from operating as intended. For example, some vehicles cannot operate a Wi-Fi camera on board because it can interfere with remote control signals that use the same frequency range or reduce effectiveness of the GPS antenna, thereby diminishing or making impossible the ability for the vehicle to determine its geographic coordinates.

(4) Landing gears/pads tend to be thin and tubular, projecting down from the arms or center body. As they serve only one function, manufacturers tend to engineer them to a minimum strength to limit deadweight of a component that is only used at the beginning and end of a flight. As a result, like the arms, they can easily break and/or bend.

(5) For the most part, existing multi-copters are weather-sensitive. Smaller products lack the stability required to tolerate windy flight conditions. Very few are capable of flying in rain or snow without risking serious damage to the electric motors, motor controllers or other vehicle electronics.

Accordingly, it would be desirable to provide an unmanned aerial vehicle that addresses at least some of the problems identified above.

SUMMARY

The aspects of the disclosed embodiments are directed to an unmanned aerial vehicle. The advantages provided by aspects of the disclosed embodiments are achieved by the subject matter of the independent claims. Further advantageous modifications can be found in the dependent claims.

According to a first aspect, the disclosed embodiments are directed to an unmanned aerial vehicle ("UAV") frame. In one embodiment the frame includes a center body component which houses the UAV flight controller and other critical electronic components, has mounting holes for securing batteries and payloads to the frame, and forms a portion of the inner wall of four circles that provide protective enclosures for rotating propellers; four identical "T-shaped" side body components coupled to and extending from the center body component at 90-degree intervals from one another; these side body components are shaped in such a way that each "stem" of the "T-Shape" forms a portion of the inner wall two circles that provide protective enclosures for rotating propellers and the end of the "T-shape" is a straight line with the widening open space moving away from the "stem" closed in on the bottom by a "floor" to form a "tray" that provides additional structural support, an interface for additional mounting options, and protection from precipitation; four identical curved "corner" body components coupled to the side body components and each forming a portion of an inner wall of a circle that provides a protective enclosure for a rotating propeller and that further contains a mesh on the top connecting the two end-points of the curvature that provides both enhanced structural strength and protection above a portion of the rotating blades from foreign objects; four motor mounts positioned below the center body component, side body components and corner body components in an "X-configuration" such that the horizontal placement of the motor mounts falls exactly in the middle of the four circles created by coupling the center body component, side body components and corner body components; four landing pads formed by the underside of the motor mounts covered on the bottom with a transparent lid to form a housing for downward-facing navigation lights; three motor arms coupled to each of the four motor mounts at 120-degree intervals (twelve arms in total), each providing equal structural support, with one motor arm extending upward to the center body component and two motor arms extending upward to a corner body component; four removable side body covers that fit over the top of the open space of the "T-shaped" side body components that when placed in their proper position create a "compartment" inside the side body components where electronics such as transmitters and receivers can be placed far enough from one another to minimize or prevent RF-interference while being protected from precipitation; four hinged arms secured to the underside of the center body component at each of four ends facing each other at 90 degree angles with openings for hook and loop fasteners and purposed for flexibly securing battery backs of various sizes and configurations; a removable translucent hood that provides protection to the flight controller and other vehicle electronics from precipitation while allowing LED indicators from the flight controller to be seen by the UAV operator; wherein the center body component, four side body components, four corner body components, four motor mounts, and twelve motor arms form a single uni-body that exhibits superior structural strength over traditional quad-copter UAV designs because the motors attach to the frame through twelve arms rather than the traditional four arms and that further exhibits superior strength to other uni-body claims because the center body component joins with the motors and outer frame through a total of eight connection points rather than four points (four motor arms and four side body components as opposed to just four motor arms).

According to a second aspect, the disclosed embodiments are directed to an unmanned aerial vehicle (UAV). In one embodiment, the UAV includes a uni-body frame; a plurality of motors coupled to the uni-body frame; and a plurality of propellers, each propeller coupled to a motor of the plurality of motors, wherein the entire perimeter of each of the propellers is encompassed by the uni-body frame.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2a, 2b and 2c depict views of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical.

DETAILED DESCRIPTION

This disclosure describes a configuration of an unmanned aerial vehicle ("UAV") that includes a frame that provides structural support to the UAV and provides a protective barrier around the UAV.

Figure 1:
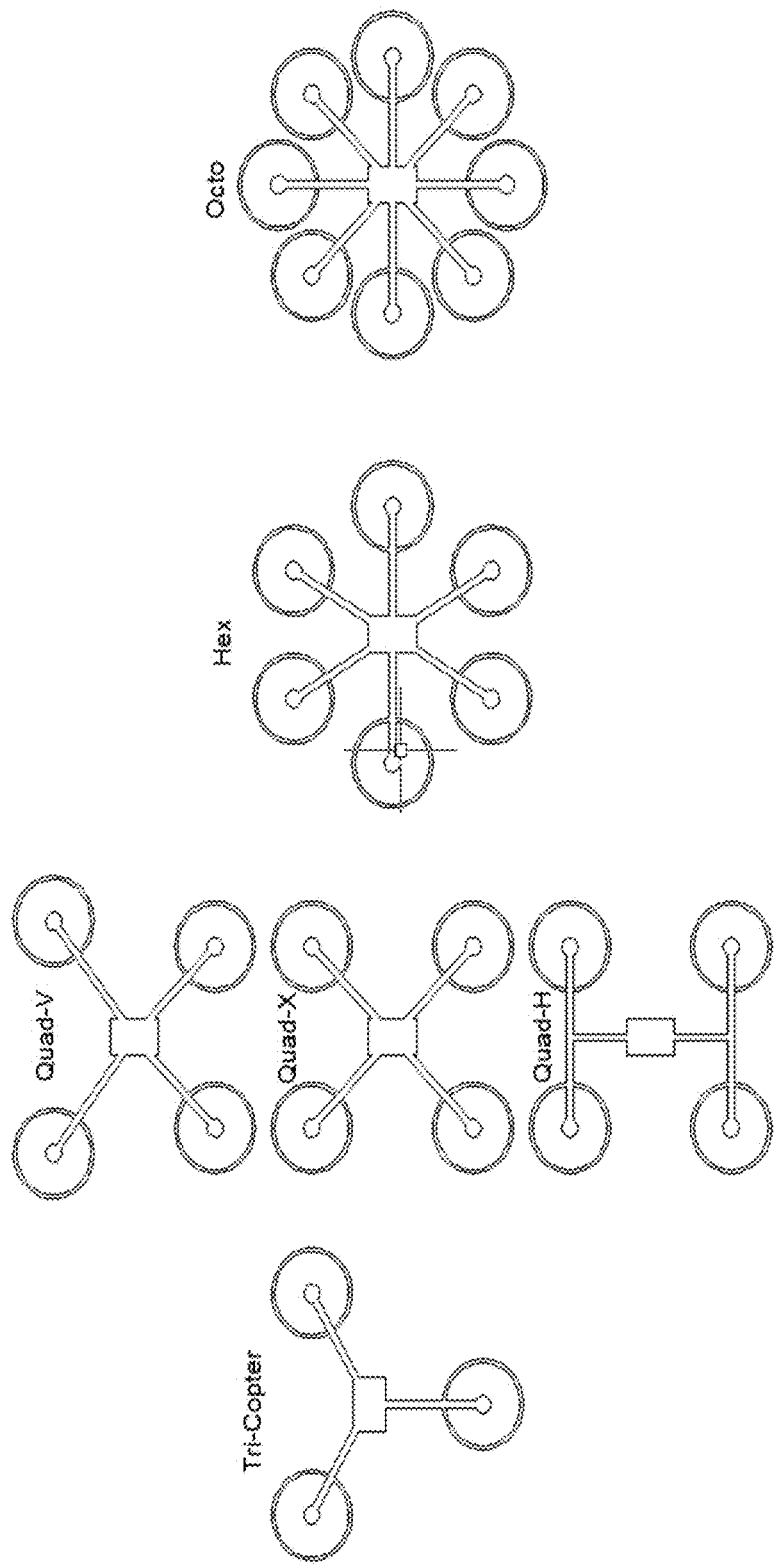
FIG. 1 illustrates common multi-copter design types.
Figure 2A:
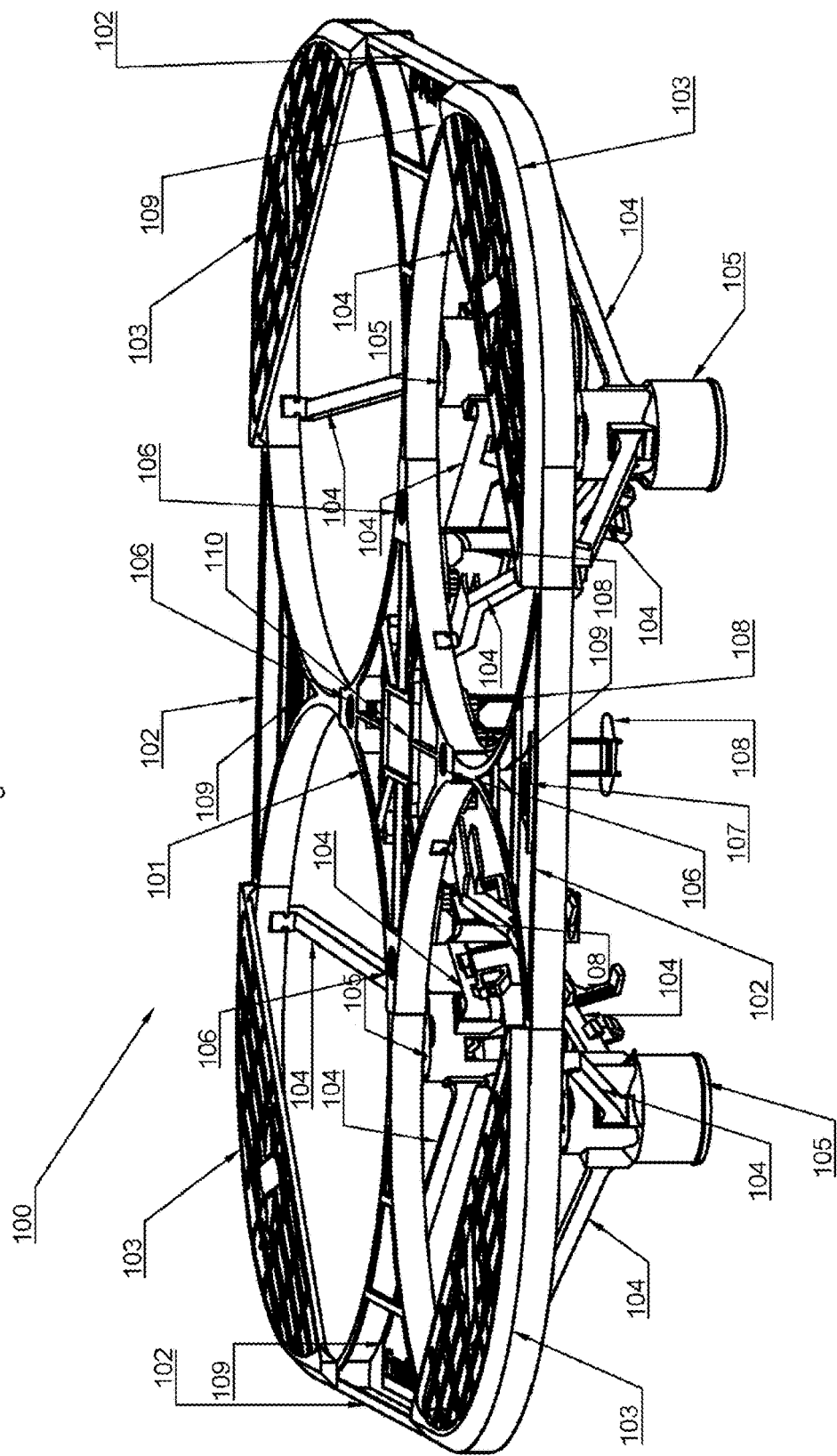

FIG. 2a illustrates a view of a UAV, according to an implementation. As illustrated, the UAV 100 includes a frame 100. The frame 100 or body of the UAV may be formed of any suitable material, such as graphite, carbon fiber, aluminum, titanium, etc., or any combination thereof. In this example, the frame 100 of the UAV is a single 3D-printed carbon fiber frame. The frame 100 includes a center body component 101, side body components 102, corner body components 103, motor arms 104, and motor mounts 105. In this example, there is a single center body component 101, four side body components 102, four corner body components 103, twelve motor arms 104, and four motor mounts 105.

The center body component 101 includes four threaded holes 106 that extend from top to bottom of the component for purposes of mounting attachments such as payloads or other flight control components like a GPS module. As the threading exists on the top and bottom of the component, separate attachments can be mounted on top or bottom, allowing for a total of 8 simultaneous attachments to be mounted. The enclosed portions of center body component 101 and side body components 102 contain ducts running through the inside so that wiring can be run through the frame and to mounted attachments. The center body component 101 also includes a suspended platform 110 for mounting a flight controller while leaving space below the platform and above the floor of the center body component 101 intended to hold other electronic components such as the power distribution board and wiring. The suspended platform 110 is held in place by a series of beams that extend out to the exterior wall of the center body component 101. These beams additionally function to provide enhanced structural integrity to the center body component 101 by reducing its ability to bend and thereby increasing the strength of the entire airframe 100. The center body component 101 also has four hinged brackets 108 secured through eight additional mounting holes beneath the center body component 101 that can flexibly secure battery packs of varying sizes and configurations and which can be tightened to secure these battery packs using commonly-sourced hook and loop mounting strips.

The side body components 102 each form a portion of the inner wall of two enclosures for the rotating propellers in addition to the outer wall of the exterior perimeter of UAV frame 100. The three walls of side body component 102 are joined by a floor 109 that (a) provides structural integrity by reducing the degree to which these walls can move relative to one another as the airframe experiences stress from turbulence, rotational torque from the motors, and lift forces from the propulsion of the propellers, and (b) creates a storage "tray" for sundry items such as transmitters and receivers so that they can be positioned far from one another to reduce RF interference. The side body components 102 also each contain threaded mounting holes 107 that can be used as additional payload mounting locations similar to mounting holes 106 on the center body component 101.

FIG. 2b shows the same frame 100 for UAV 100 additionally with side body covers 110 and center body cover 111. All of the covers are removable and intended to be used as desired by the operator to protect components from foreign objects and precipitation. If such protections are not deemed necessary, UAV 100 can be operated without them to increase flight time by reducing the weight of the aircraft. These covers provide protection, but not structural support. Center body cover 111 in this configuration, has a transparent top so that the operator can see LED indicator lights from the flight controller beneath the cover.

Figure 2C:
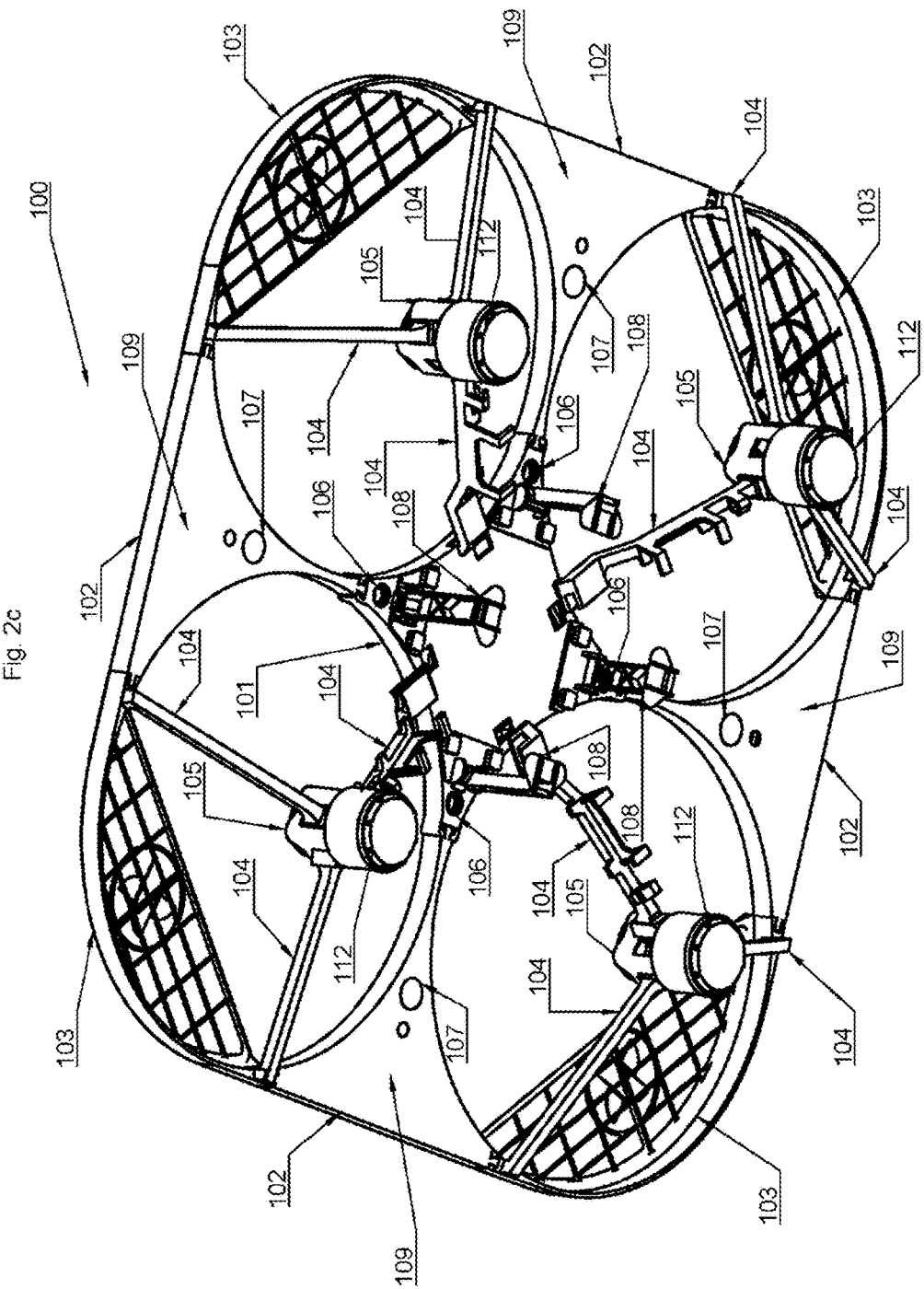

FIG. 2c shows the same frame 100 for UAV 100 as FIG. 2a, but from a perspective below the frame 100. FIG. 2c shows a better perspective of the motor mounts 105 used for additional purposes as landing pads and, using clear covers 112 beneath the landing pads, compartments for downward-facing navigation lights that allow the operator to visually identify the orientation of the UAV in the air from greater distances to enhance visual line of sight flight control.

Figure 3:
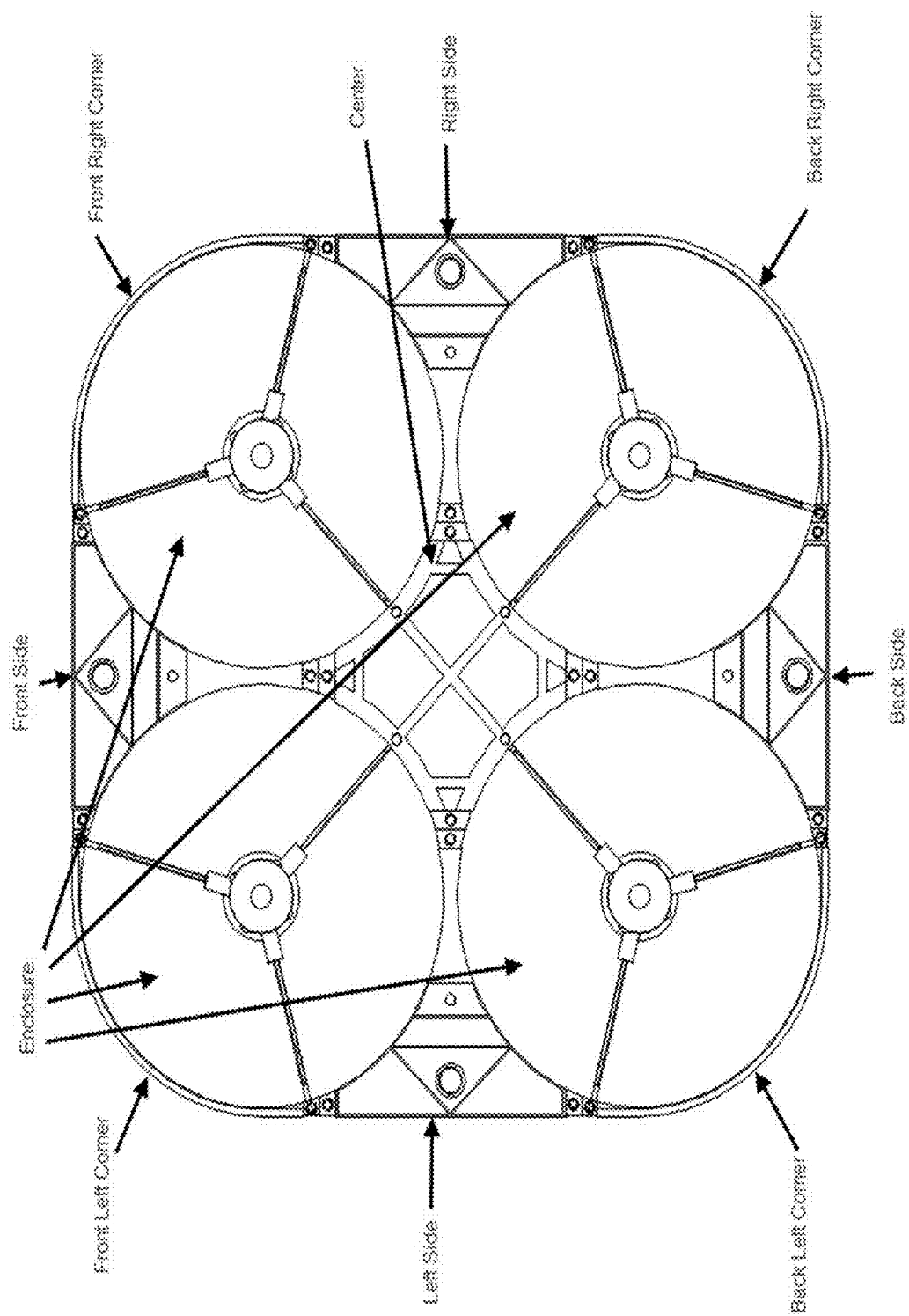
FIG. 3 illustrates a top view of an exemplary surround frame incorporating aspects of the disclosed embodiments.

The aspects of the disclosed embodiments are directed to an airframe assembly for a UAV, also referred to herein as a "surround frame." In one embodiment, the surround frame generally comprises nine parts or assemblies. Referring to FIG. 3, the assemblies that make up the surround frame generally include a front side arm assembly, a back side arm assembly, a left side arm assembly, a right side arm assembly. A center body assembly joins the side arm assemblies together. Also included are a front left corner assembly, a front right corner assembly, a back right corner assembly and a back left corner assembly. The corner assemblies are connected to respective ones of the side assemblies, as is shown in FIG. 3.

Figure 4:
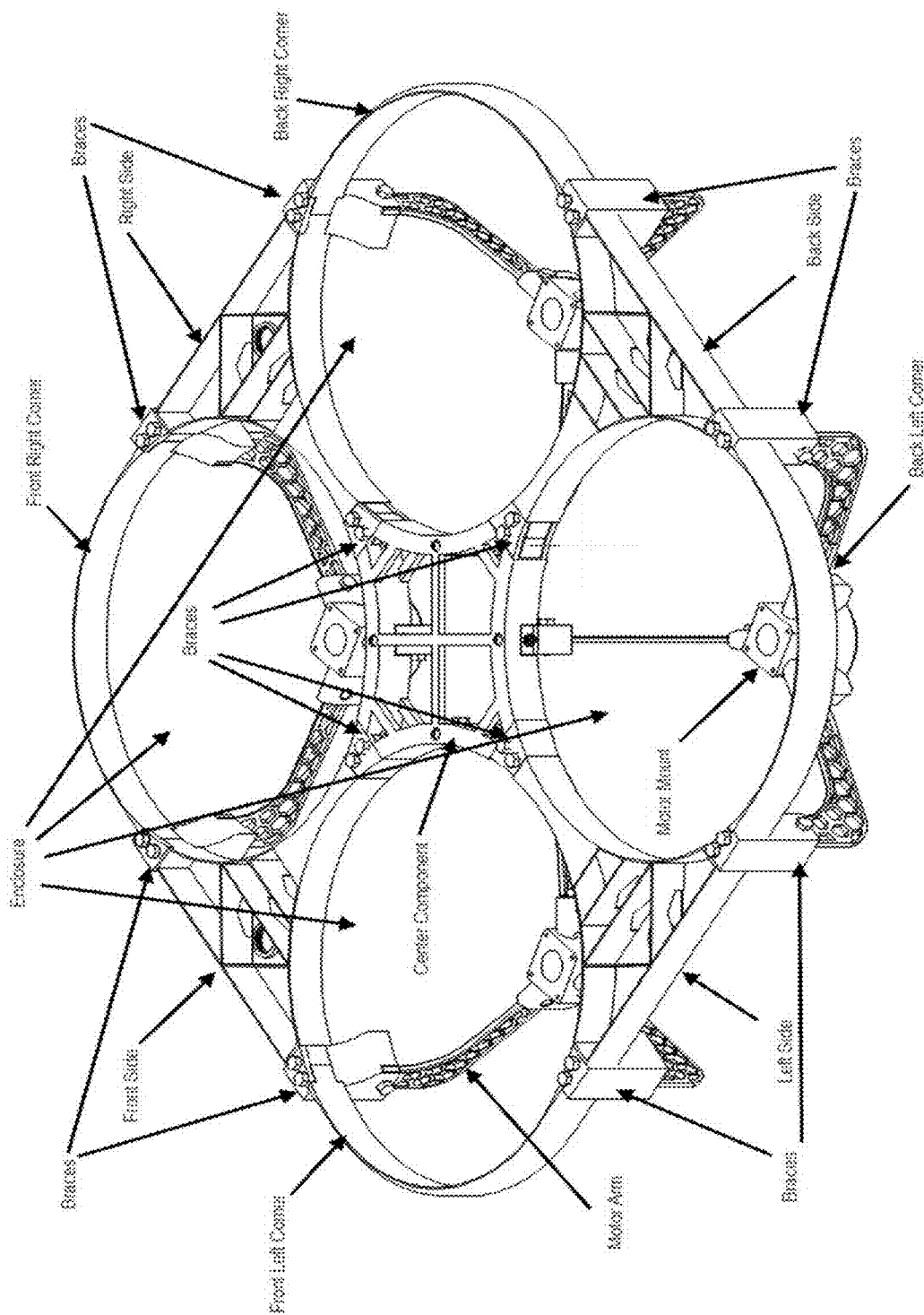
FIG. 4 illustrates a perspective view of an exemplary surround frame incorporating aspects of the disclosed embodiments.
Figure 5:
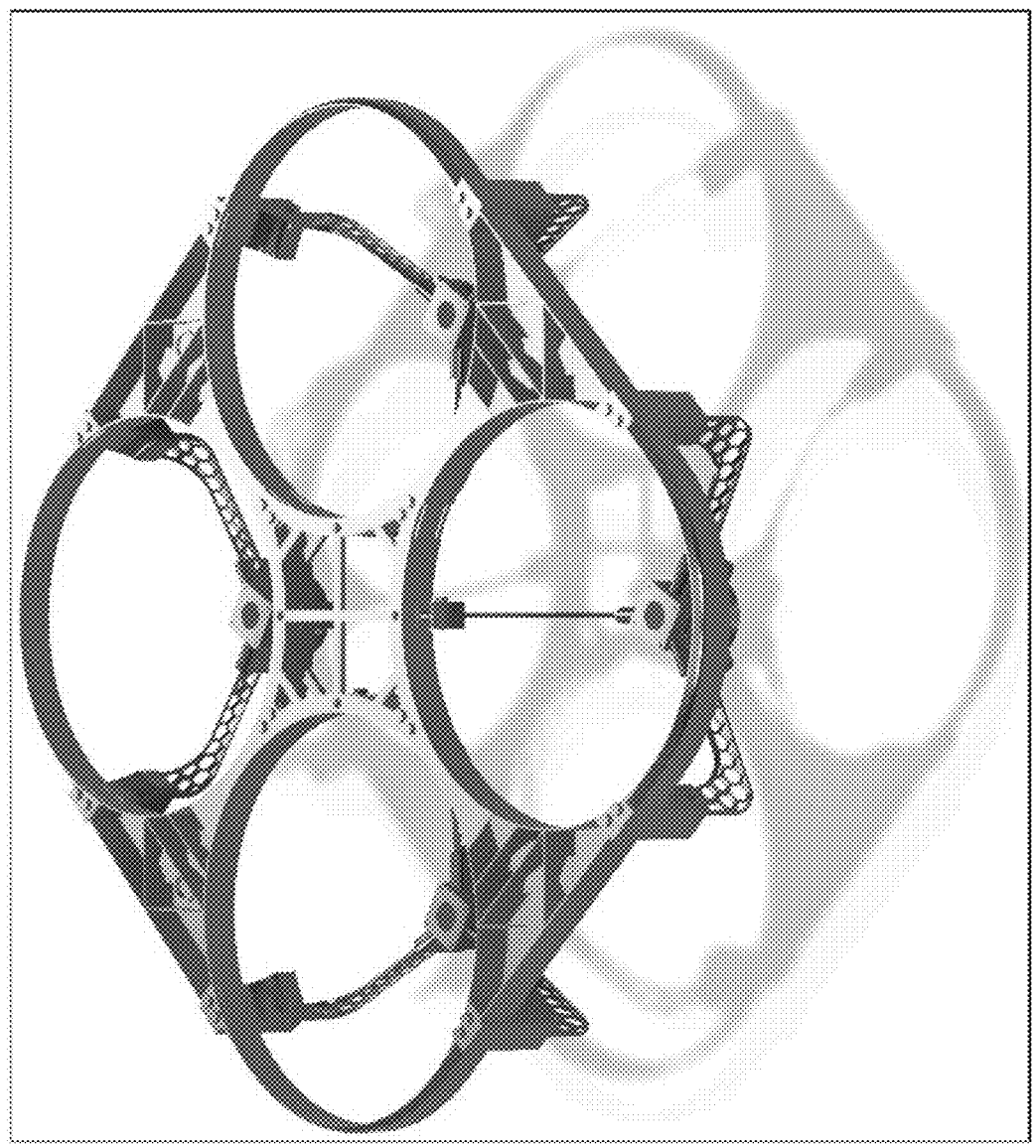
FIG. 5 illustrates another perspective view of the exemplary surround frame shown in FIG. 4.

The different assemblies that make up the surround frame can be joined together by braces, referring to FIGS. 3-5. The corner assemblies shown in FIG. 3 are interchangeable, as are the side assembly component. The third unique component is the center body component.

The surround frame shown in FIGS. 3-5 provides a complete enclosure for each propeller blade. The propeller blades, of which four are shown in FIGS. 3-5, are configured to rotate within their respective enclosures. Unlike some smaller products that feature detachable blade enclosures as a separate component, my surround frame integrates the enclosures into the structural assembly itself. In other words, the strength of the entire frame is derived from all of the components. In contrast, other products that enclose the blades have the traditional plate and arm design underneath, with the enclosure simply sitting on top, or partial enclosure attached to the ends of the arms, purely adding weight but offering no improvement to structural integrity. My design is able to incorporate the enclosures into the structural frame itself and thereby enhances the strength-to-weight characteristics of the vehicle, rather than detracting from them.

Figure 6:
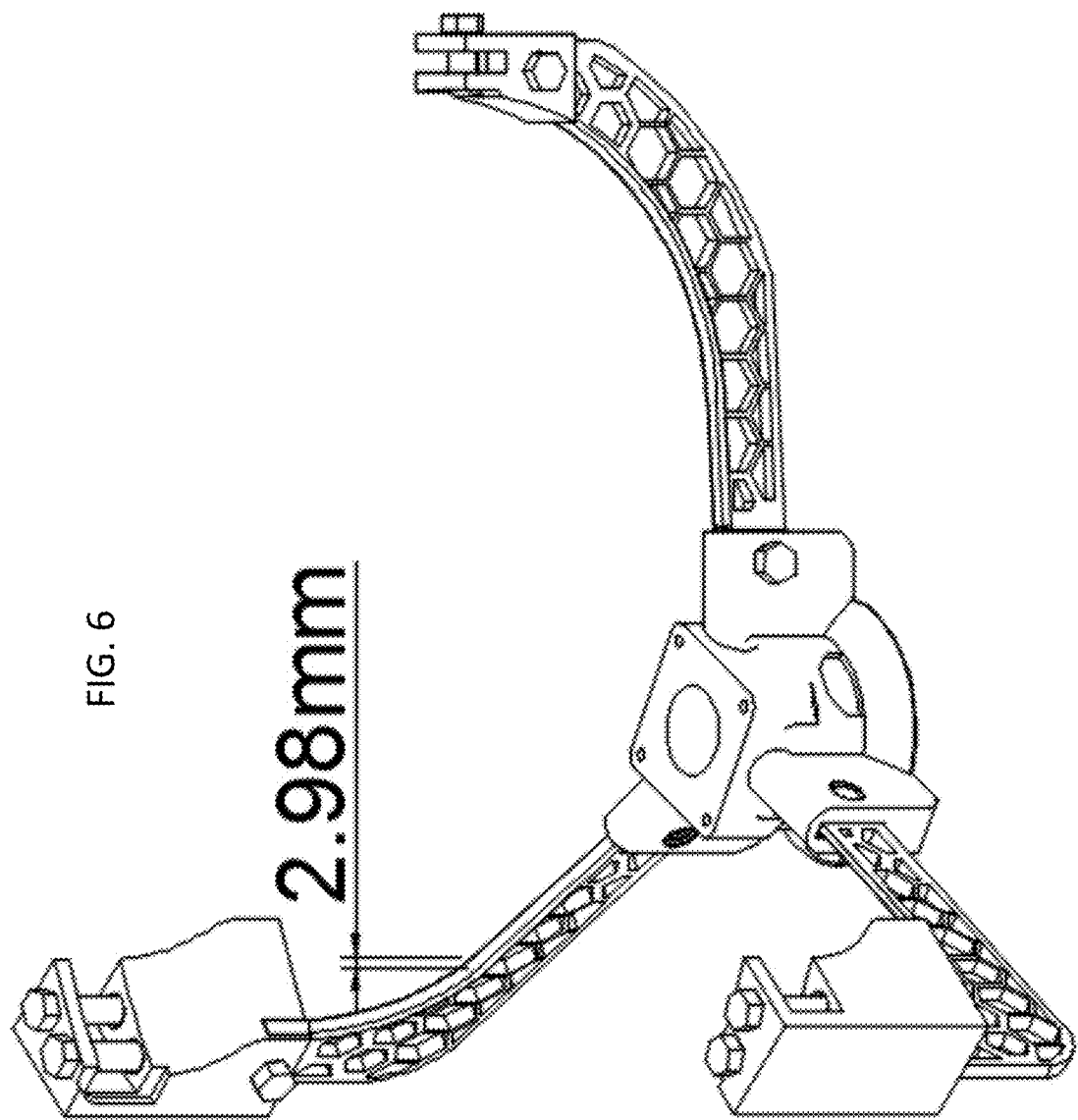
FIG. 6 illustrates a perspective view of an exemplary motor mount assembly incorporating aspects of the disclosed embodiments.
Figure 7:
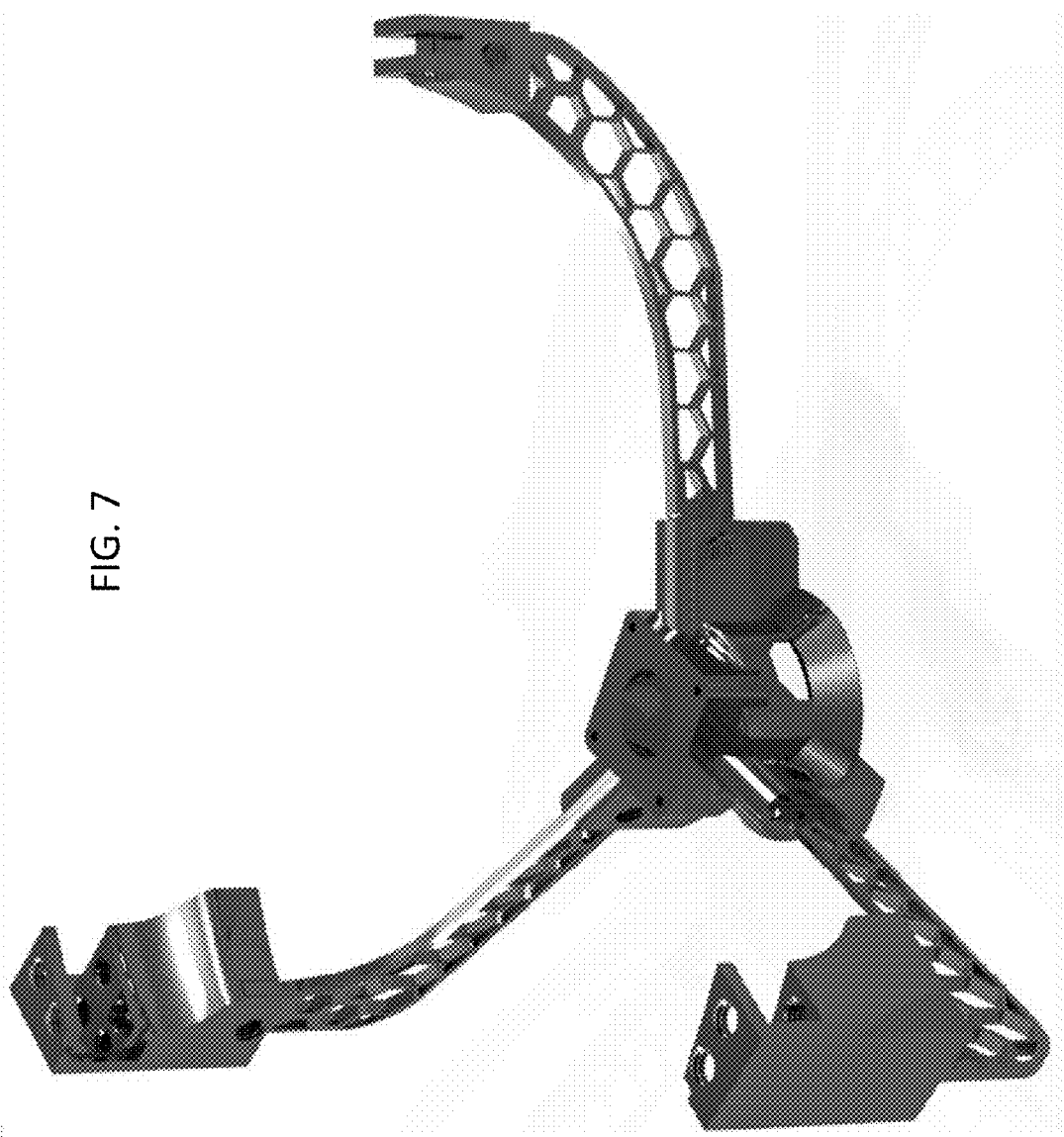
FIG. 7 illustrates another perspective view of an exemplary motor mount assembly of FIG. 6.

Referring to FIG. 6, the motor mounts sit below the center of the enclosures and attach to the frame through three arms each (for a total of 12 arms) at roughly or approximately 120° angles to one another, projecting upwards from the motor mount, at an angle, to the frame (FIGS. 6-7).

This allows the forces from the motors to be distributed through 12 arms, rather than four, and because the arms extend at approximately 60 degree angles from the motor mount to the surround frame, the stresses from motor torque are reduced. Because of the number of arms, they can be fairly thin. Since the arms in any design must pass below the spinning propellers for most of their length into the frame, thinner arms, such as the one in my design, minimize wind resistance from the significant downward airflow caused by the spinning propellers that act as a counter-lift force on the vehicle.

A significant consideration in multi-copter design is noise and vibration. The two sources of noise are the propellers spinning through air (the propeller tips can be traveling close to the speed of sound) and vibration from the motors resonating through the frame. There are limited options for suppressing propeller-related noise, but vibration is an area that can be controlled. To that end, the aspects of the disclosed embodiments includes several features that have greatly reduced vibration, and have resulted in a very "quiet" vehicle in this size category.

First, there is a layer of vibration-reducing foam between the motor and motor mount. The foam is held in place by adhesive on the top and bottom side of the foam as well as the pressure of the motor assembly held onto the motor mount through 4 screws.

Figure 8:
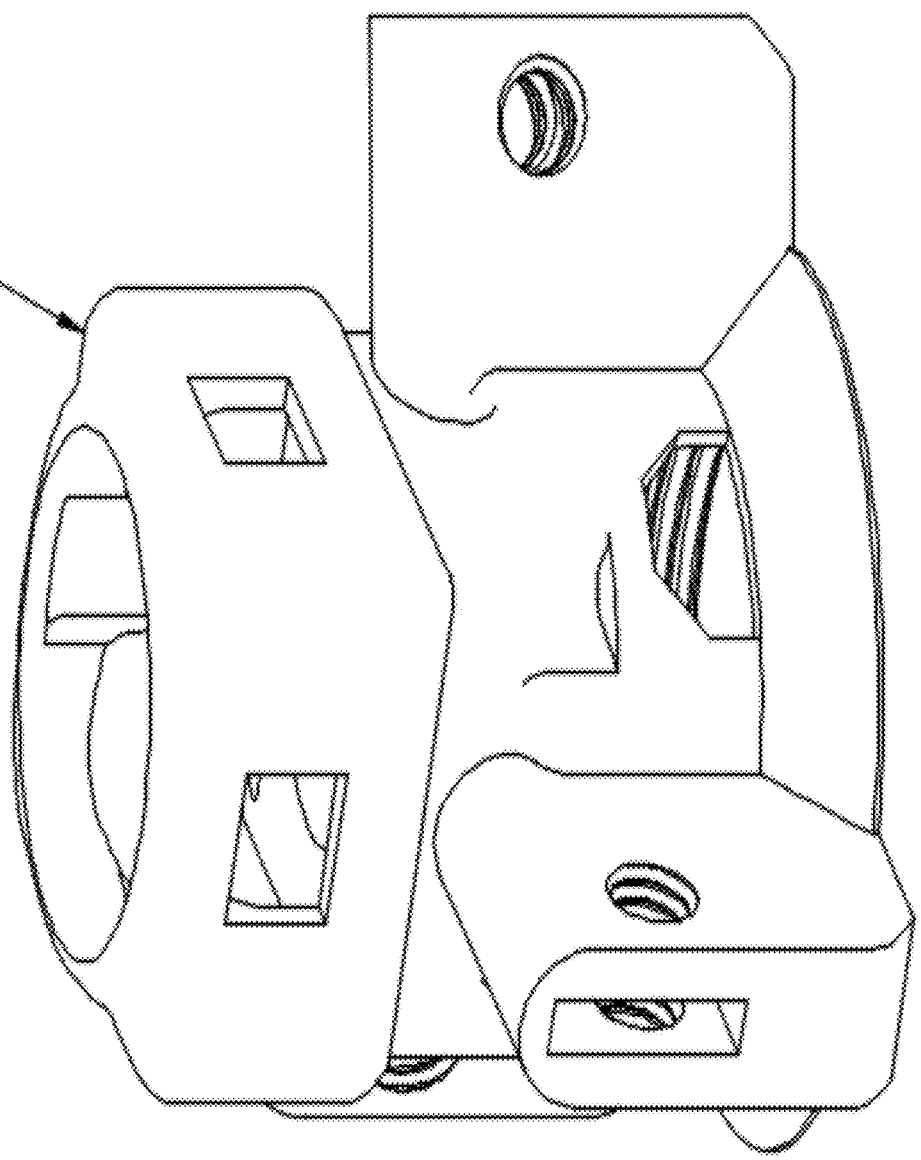
FIG. 8 illustrates a perspective view of a motor mount and vibration dampening motor sleeve incorporating aspects of the disclosed embodiments.
Figure 9:
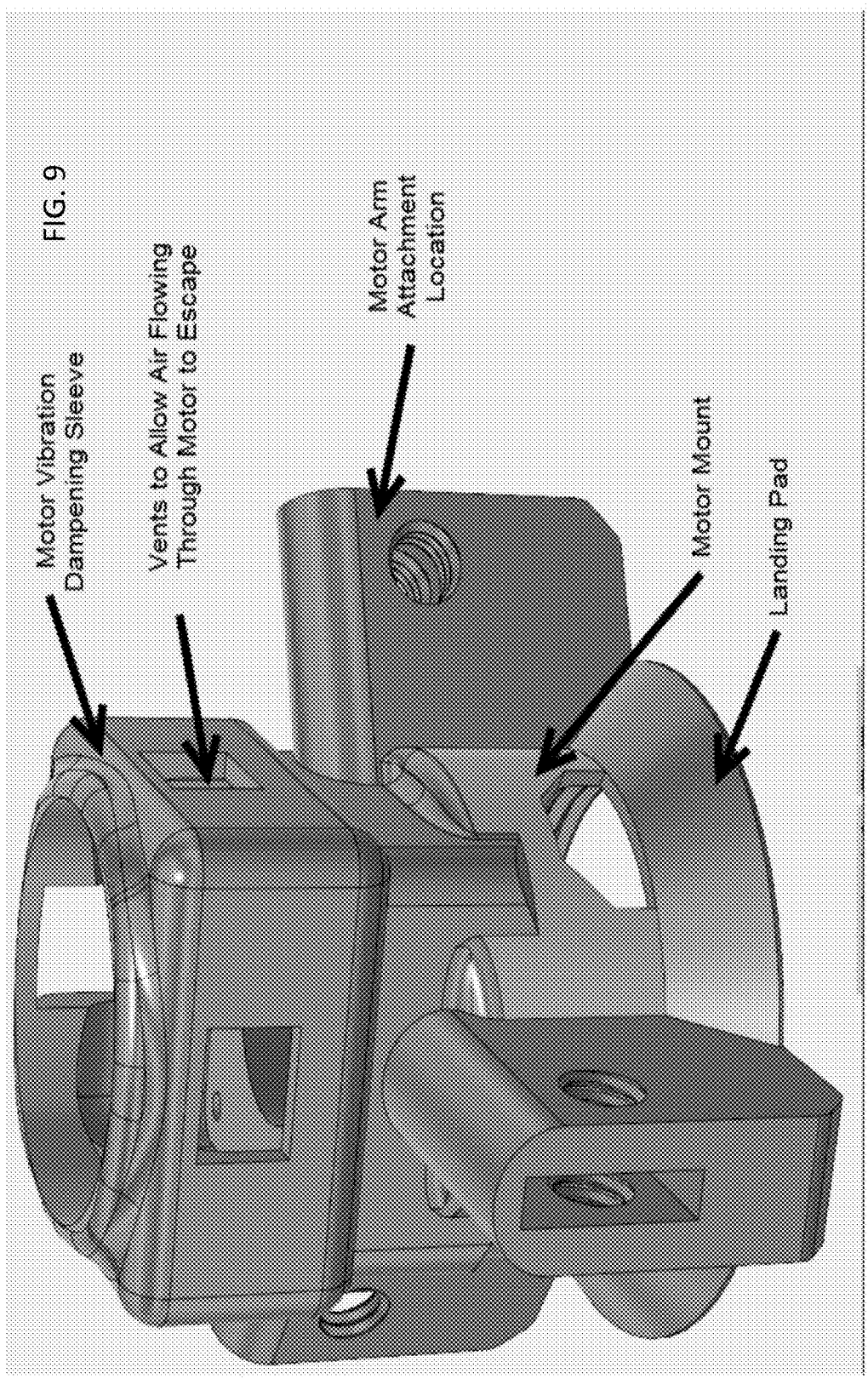
FIG. 9 illustrates another perspective view of a motor mount and vibration dampening motor sleeve incorporating aspects of the disclosed embodiments.

Second, the aspects of the disclosed embodiments also include a motor "sleeve", constructed with a very soft, flexible rubber-like material that slides tightly around the non-rotating bottom portion of the motors as well as the top portion of the mount itself (See FIGS. 8-9). The tight fit helps to capture and dissipate some of the motor vibration directly at the source to reduce the amount of vibration that resonates out to the rest of the frame.

Figure 10:
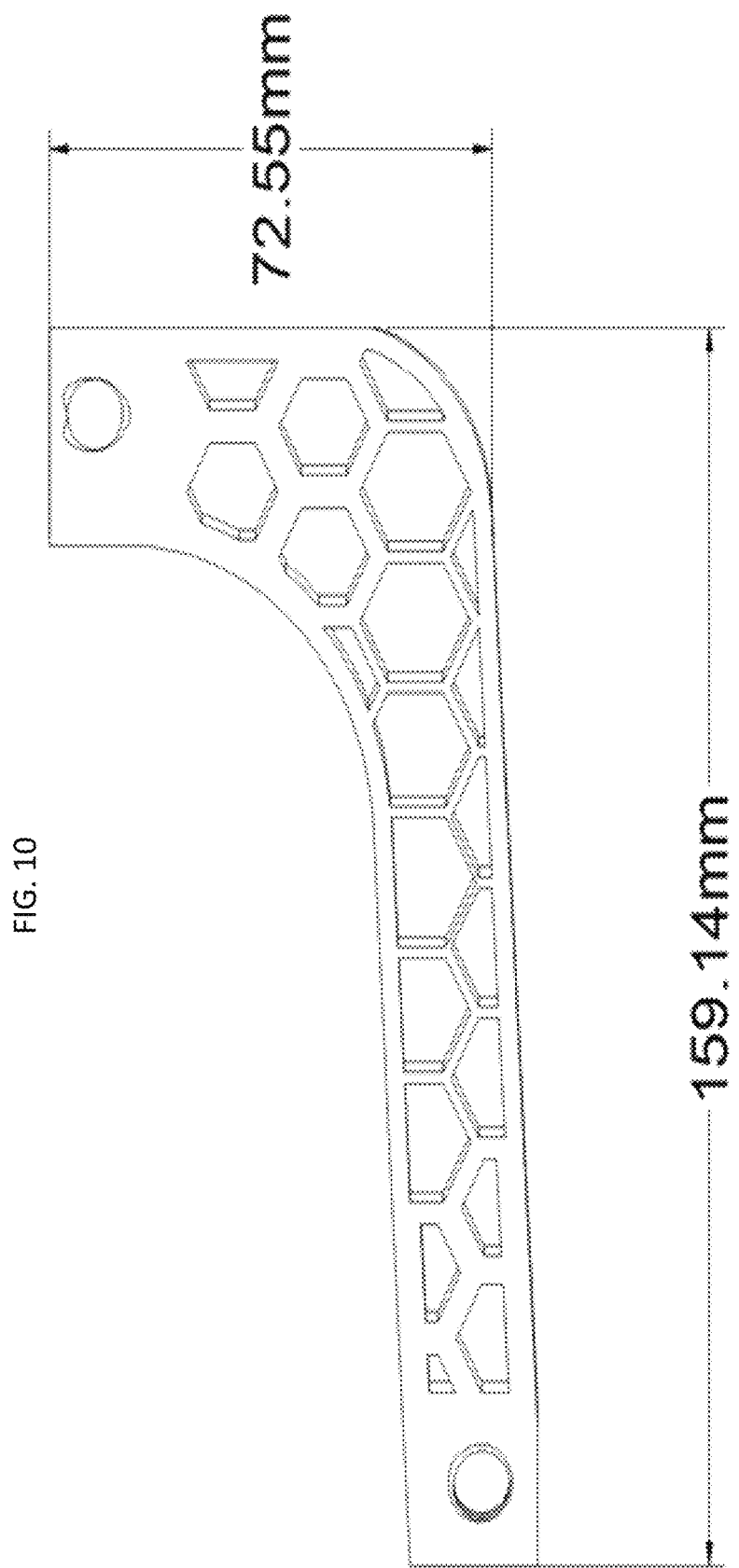
FIG. 10 illustrates a side view of a motor mount arm incorporating aspects of the disclosed embodiments.

Third, in an effort to reduce the remaining vibration from resonating through the rest of the frame, the 12 motor arms are constructed with an open honeycomb design (See FIG. 10) that provides sufficient structural strength, while limiting the surface areas through which vibration can even travel into the surround frame from the motor mounts. The honeycomb design, consisting of interlocking carbon-fiber hexagons, is a proven superior-strength infill for solid materials. In the case of the motor arms, rather than apply a solid face to the honeycomb, they are left exposed in order to reduce surface area leading back to the frame.

After having initially used solid material construction for the arms, switching to the honeycomb structure resulted in significantly quieter operation.

In one embodiment, the entire surround frame, as well as the motor arms and some of the braces, can be constructed out of a carbon fiber composite material, offering excellent strength-to-weight dynamics. In alternate embodiments, any suitable material can be used that provides similar strength-to-weight dynamics. The use of such a material allows the body walls to be just 1.5 mm thick in most areas, and as thin as 0.6 mm in some areas. Other parts of the vehicle, including the motor mounts, battery compartment and the rest of the braces can be constructed out of wood-fiber composite material. Advantageously, the entire vehicle can be produced through a 3D printing process and then assembled using 3D-printed carbon fiber composite pins through the braces that join the components of the frame and motor mount assemblies.

The specific areas of improvement to multi-copter airframe offerings currently in the market are as follows (first in order of the current product weaknesses identified above, then highlighting new enhancements not currently available).

(1) As already described in the general description of the invention, the "surround frame" encloses the spinning propeller blades (See e.g. FIGS. 3-5). As these enclosures are a structural component of the frame, they have sufficient strength to not only accidentally come into contact with people without causing harm, but also "bounce" off objects, such as trees or buildings, after unintentional light collisions. Although the carbon fiber material is rigid by nature, the thinness of this particular construction offers a degree of flexibility, enabling such a "bumper" effect. This can be viewed as analogous to bumpers on a car, which can absorb small impacts without damaging the vehicle. Obviously, similar to cars, more significant impacts will cause damage to the frame. Testing has shown that typically, the frame will flex inward from a more significant collision to the point where the blades make contact with the frame, causing the propellers to break, which quickly causes the vehicle to fall to the ground. Generally speaking, though, the propeller is unable to cause any damage other than to the vehicle prior to ground impact. This represents a significant step forward in creating a safer multi-copter. Furthermore, the frame is designed, in the event of a crash, to break along the braces, leaving as many large components intact as possible. Empirical data has shown this to be the case.

(2) The surround frame, in conjunction with the motor assemblies connecting to the frame through 12 arms (See e.g. FIGS. 3-5), distributes strain from the vehicle's weight and flight operations. Fully loaded with motors, motor controllers, batteries and other vehicle electronics, the liftoff weight ranges from approximately 12-15 pounds. At roughly 15 pounds, the frame exhibits almost no flex, which along with the vibration control features described above, helps to limit vibration and related noise. In fact, testing has shown vibration levels (as measured by average G-Forces on each of the x, y and z axes, while maintaining a steady hover, are lower than any other UAVs I have been able to find data for.

Figure 11:
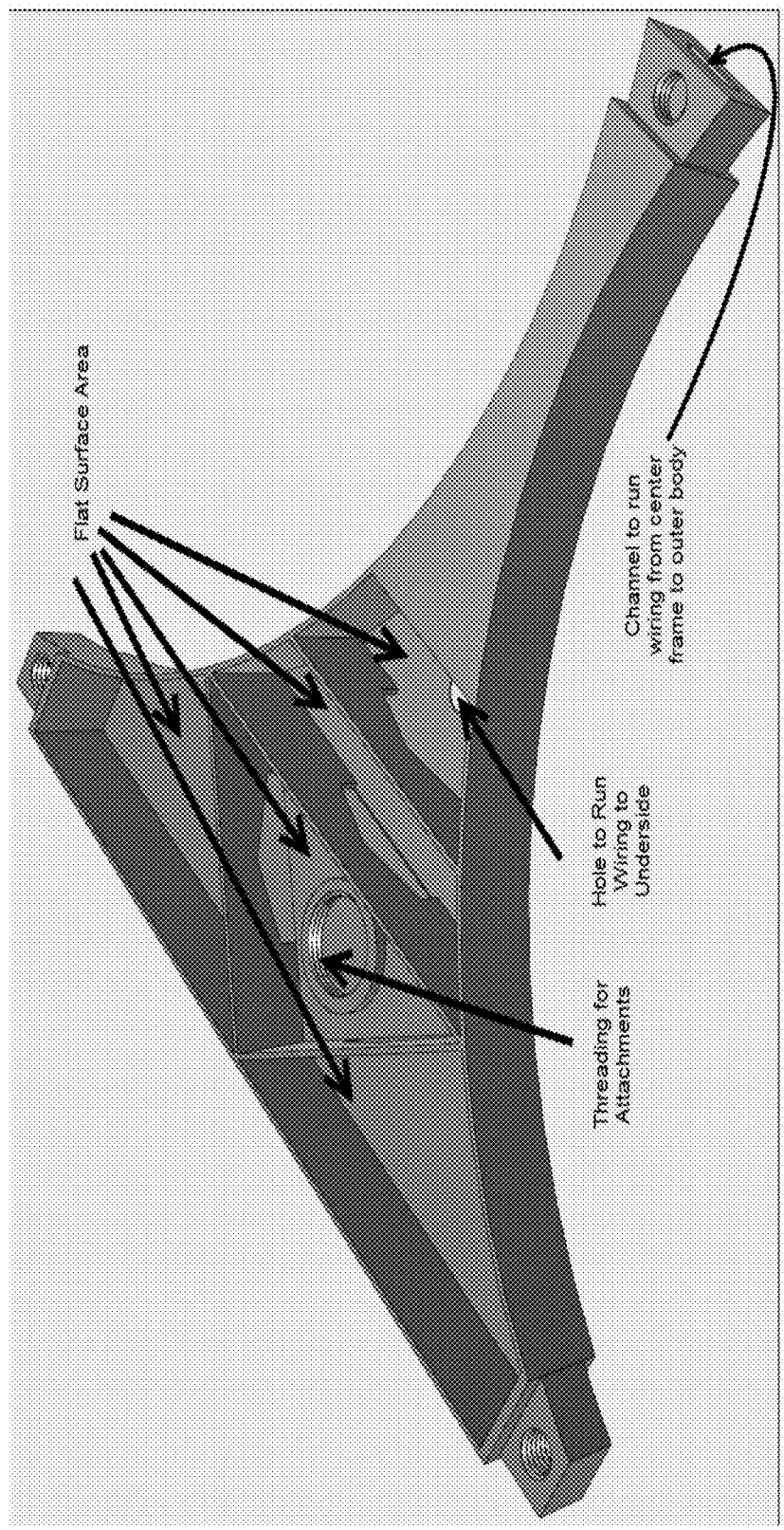
FIG. 11 illustrates a perspective view of a side arm assembly incorporating aspects of the disclosed embodiments.

(3) The surround frame design yields significant flat surface area, both above and below the frame, at little cost to the vehicle's weight (See e.g. FIG. 11).

The surface joining the walls of the propeller enclosures on each side is just about 0.6 mm thick, but offers ample area to house RF-sensitive and other electronics far enough from one another so as to minimize, if not eliminate, interference from other devices, and from electrical and magnetic interference from the electric motors. The covered portion of the side bodies extending from the center frame component is hollow to allow for wires to be pulled through from the autopilot and other electronics in the center of the vehicle. A pre-constructed hole in each of these four surfaces permits wiring, such as antennas, to be pulled to the underside of the vehicle. There is also preconstructed threading on the top side of each surface to accommodate mounting attachments either protruding upwards or downwards. The diameter of the threading is wide enough to accommodate large attachments. The bottom of the threading is solid, but just about 0.3 mm thick, such that it can easily be cut out or punched out with a finger to accommodate attachments extending downwards. In total, there are approximately 217 in$^2$ of mounting space on the top and bottom of the surround frame on the four sides of the surround frame of the vehicle. At the furthest reaches, electronics could be mounted approximately one foot away from other electronics inside the center frame and about three feet away from electronics on opposite sides of the vehicle. The ability to reduce interference by separating electronics is an alternative to using shielding materials that would add weight to the vehicle. Such shielding could of course be used in conjunction to provide even superior protection from motor and RF interference.

(4) In contrast to the typical legs or helicopter-style landing pads used in multi-copters, my airframe uses the underside of the engine mounts as landing pads (See FIG. 9). The advantages of this design are twofold: (1) they are sturdy since they are part of a component that is already the densest in the whole frame due to the need to be able to handle the forces from the electric motor; (2) they absorb impact force evenly up through the surround frame in the same way that propulsion and torque from the motors are (through the 12 motor arms). These landing pads will not bend and are highly unlikely to break during hard landings. This contrasts with typical designs that have to absorb impact force through tubes or plastic protrusions from the center of the frame that often break or bend during rough landings.

Figure 12:
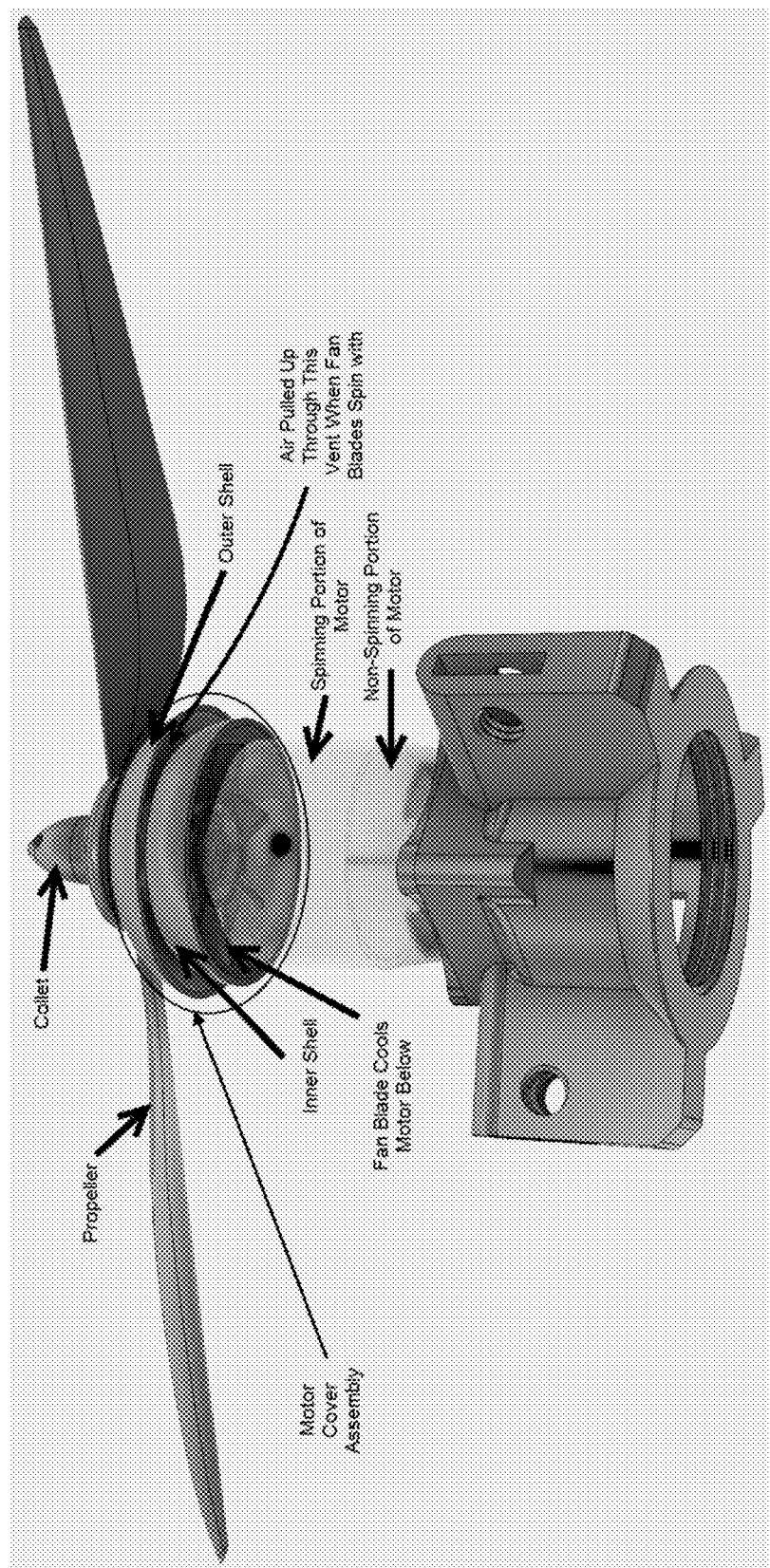
FIG. 12 illustrates a detailed view of a motor cover assembly incorporating aspects of the disclosed embodiments.

(5) As part of the overall assembly, the aspects of the disclosed embodiments include a unique motor cover that fits onto the motor shaft below the propeller, such that it spins with the propeller. (See e.g. FIG. 12).

The motor cover assembly generally comprises an outer shell, an inner shell, fan blades and a vent defined between the outer shell and the inner shell. The motor cover assembly is configured to prevent environmental elements, such as rain and snow, from entering the air cooling vents on the top of the motors. To compensate for covering the air vents, the inside of the motor cover has an inner shell suspended by a fan blade that pushes air down into the motors, pulling in the air from below the motor cover, thereby cooling the motors even while rain or snow are falling. Because of this additional component, along with using best practices for covering other electronic components and shrink wrapping motor controllers that are exposed to weather elements, this UAV is designed to fly in rain and snow, making it unique among competitors.

Figure 13:
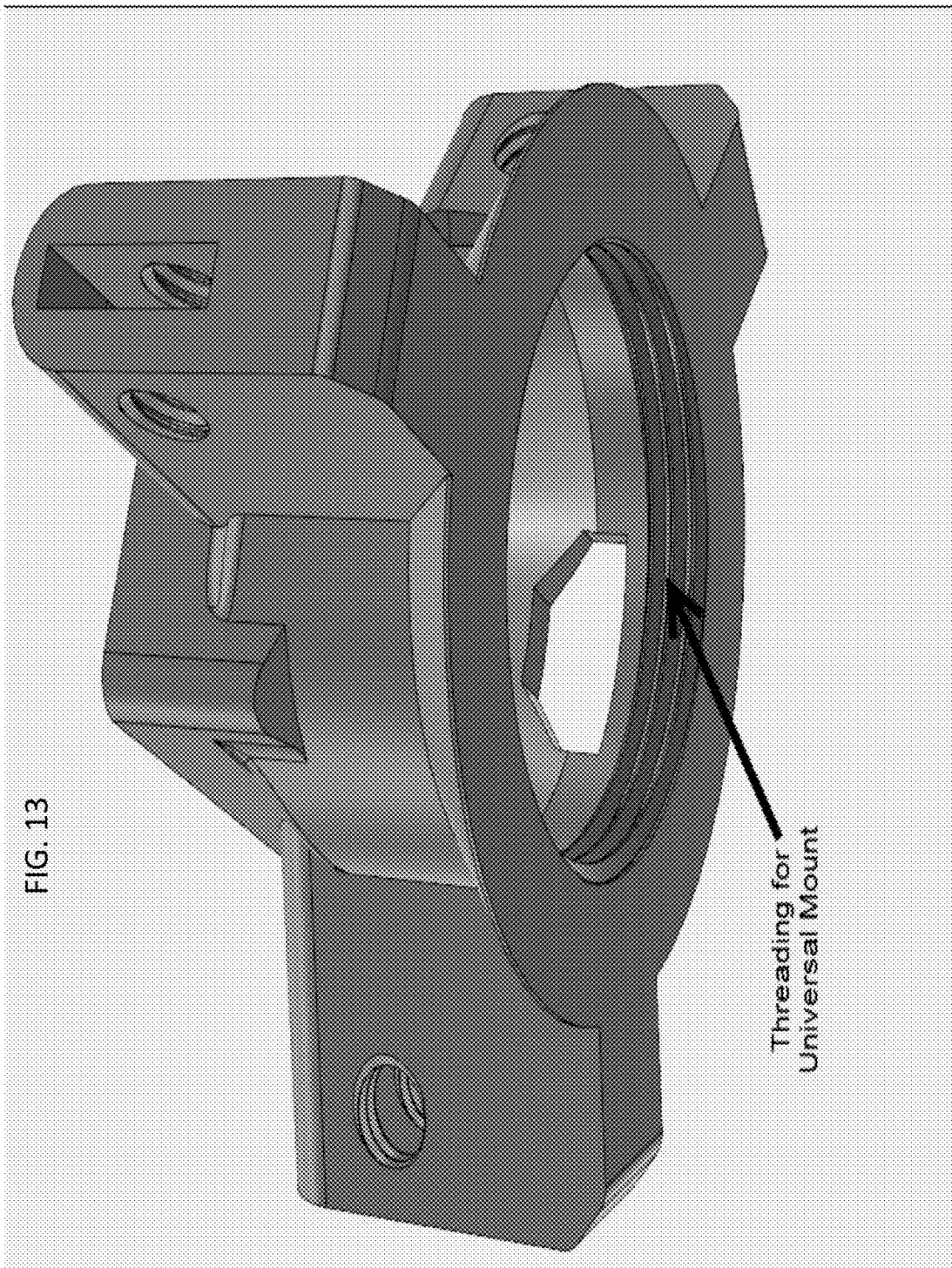
FIG. 13 illustrates a universal mount interface incorporating aspects of the disclosed embodiments.
Figure 14:
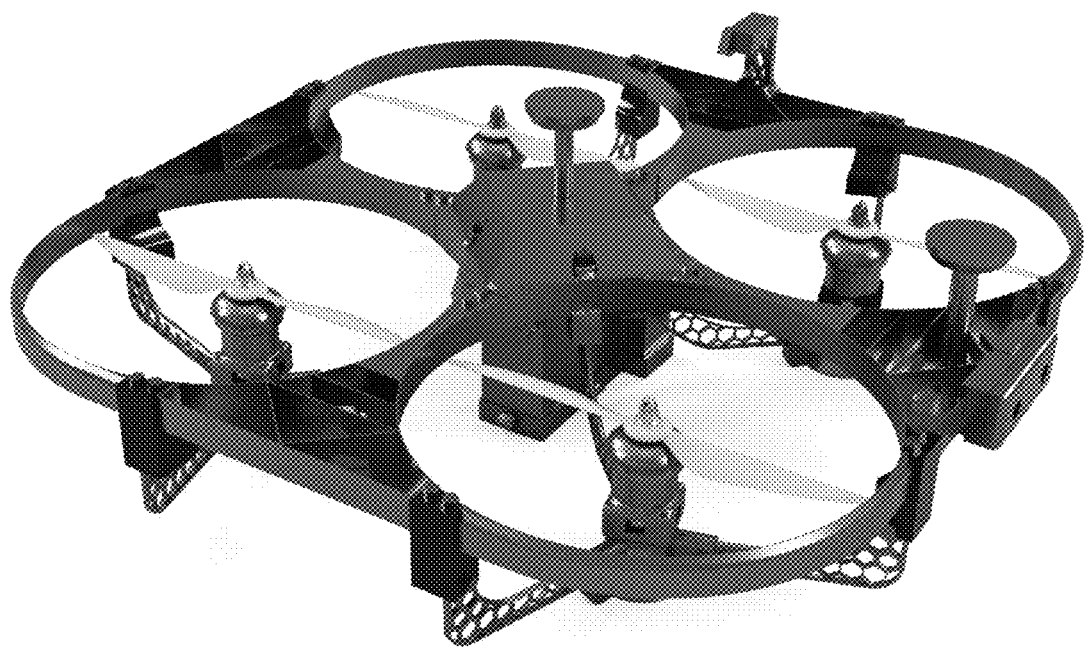
FIG. 14 illustrates a perspective view of a UAV assembly incorporating aspects of the disclosed embodiments.
Figure 15:
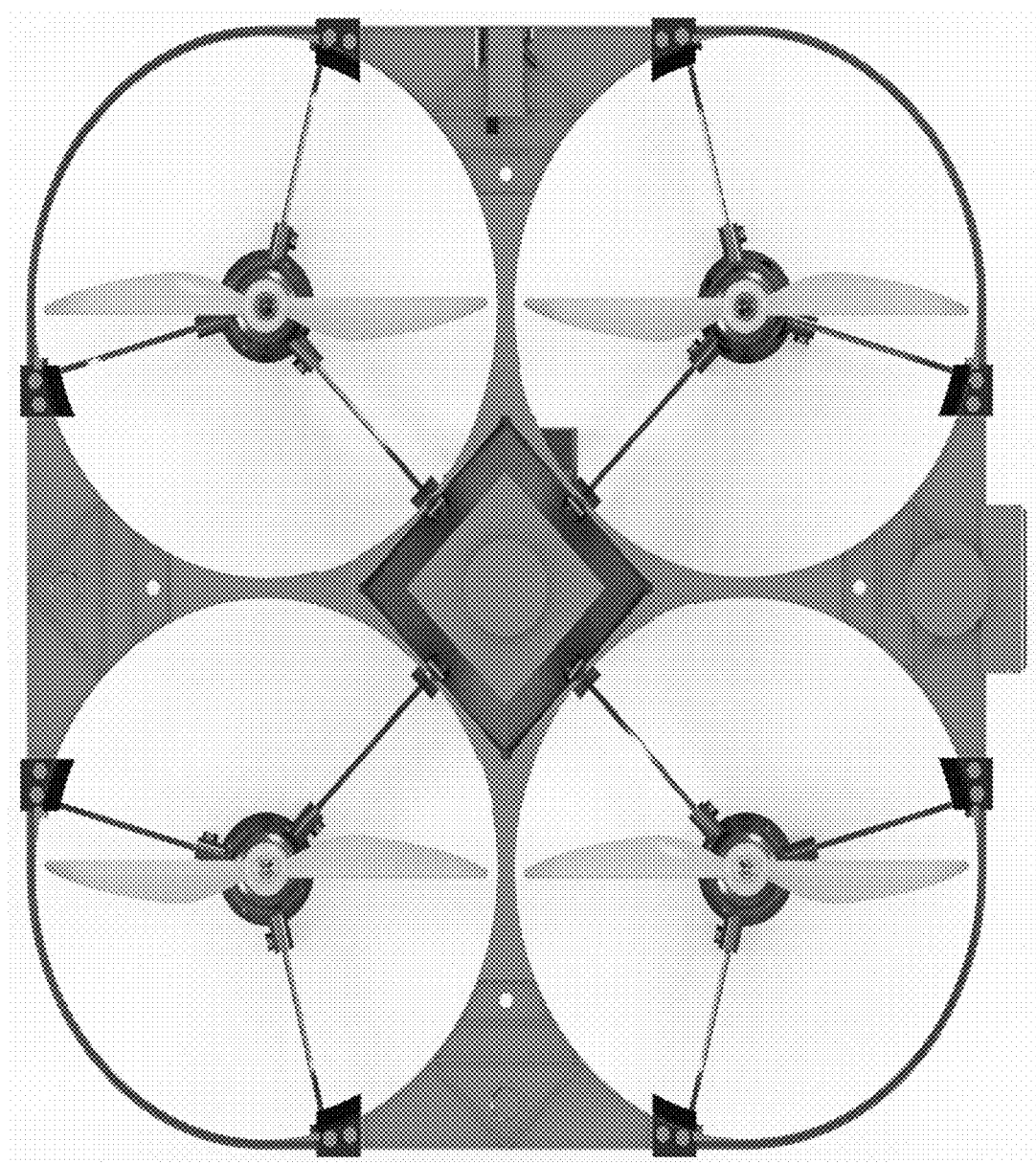
FIG. 15 is a top view of the UAV assembly shown in FIG. 14.
Figure 16:
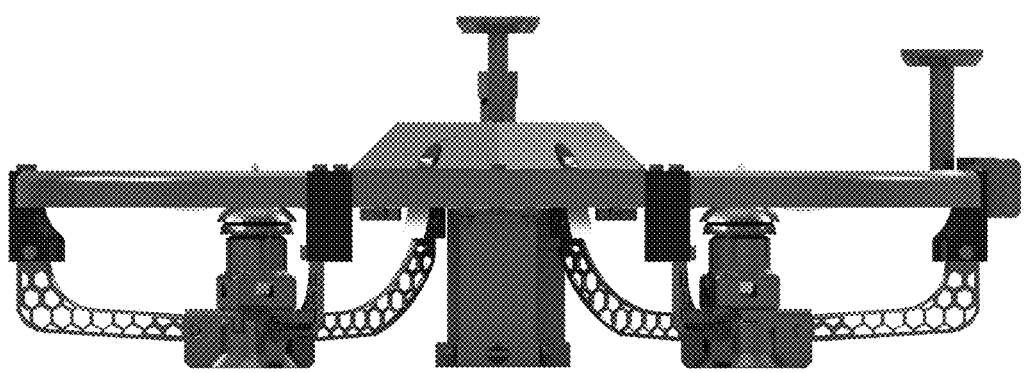
FIG. 16 is a side view of the UAV assembly shown in FIG. 14.
Figure 17:
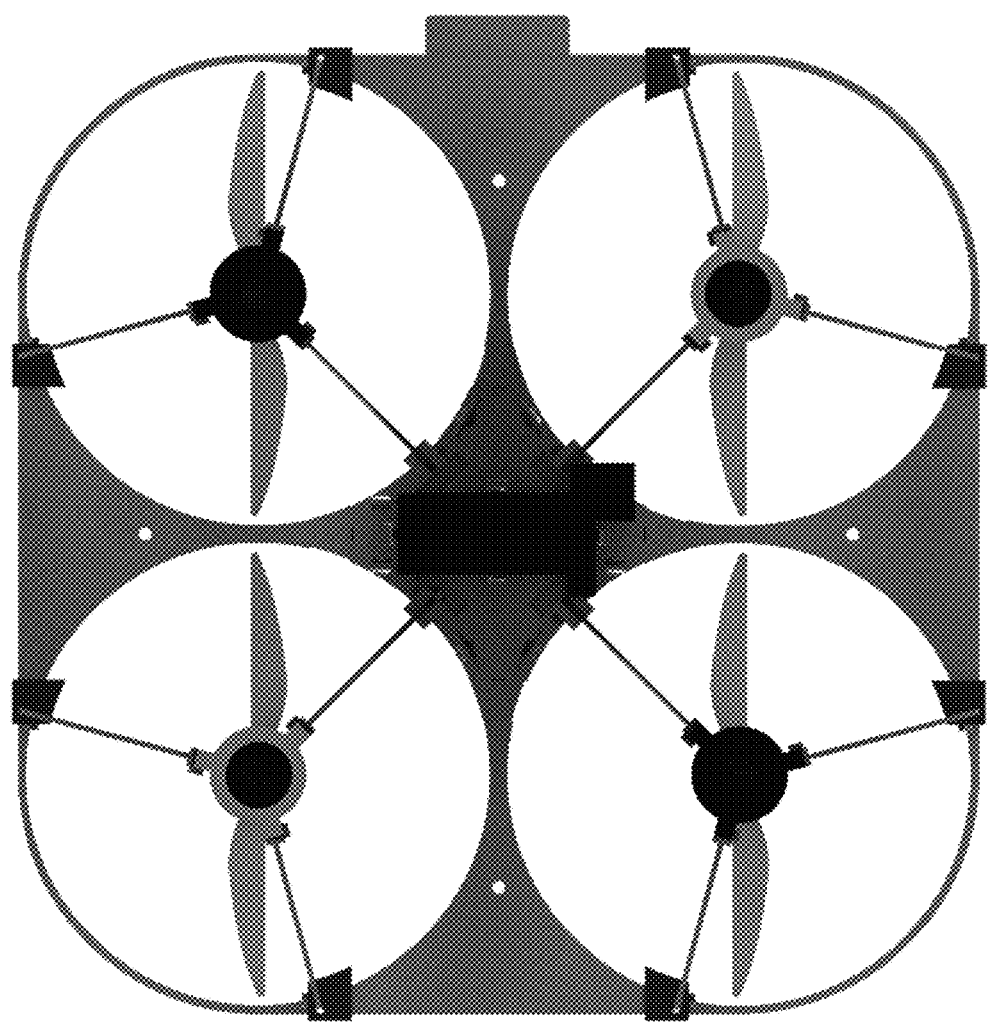
FIG. 17 is a bottom view of the UAV assembly shown in FIG. 14.

The aspects of the disclosed embodiments also include a universal mount interface. This is shown in FIG. 13. In addition to the engine mount serving a dual use as a landing pad, it actually serves a third purpose as the interface for a future universal mount because of threading on the inner wall of the landing pad on the underside of the motor mount. As such, there are four interfaces. The advantage of this approach is that future attachments, which could include ones for carrying heavy payloads, or tools such as robotic arms that could be used to perform certain tasks, could be secured to the vehicle in four locations rather that one, thus reducing the risk of breakage. Furthermore, the weight of the attachments would be carried directly by the motors above the threading so that additional weight would not have to be carried by the rest of the airframe. I view this as a key feature of the design that allows the vehicle to confidently carry significant additional weight without putting strain on the airframe and reducing its useful life.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An unmanned aerial vehicle ("UAV") frame, comprising:
    a center body component configured to house a UAV flight controller and other critical electronic components, the center body component having mounting holes for securing batteries and payloads to the UAV frame, the center body component forming a portion of an inner wall of four circles defined by the UAV frame that provide protective enclosures for propellers;
    four identical T-shaped body components that are coupled to and extend from the center body component at 90-degree intervals from one another, wherein a stem of the T-Shape forms a portion of the inner wall of two of the four circles providing protective enclosures for the propellers, and wherein the end of the T-shape is a straight line with a widening open space moving away from the stem closed in on the bottom by a floor to form a tray;
    wherein the frame further comprises four identical curved corner body components coupled to the side body components and each forming a portion of an inner wall of one of the four circles providing a protective enclosure for the propellers, the curved body components further including a mesh on the top connecting the two end-points of the curved components;
    four motor mounts positioned below the center body component, side body components and corner body components in an X-configuration such that the horizontal placement of the motor mounts falls exactly in the middle of the four circles created by coupling the center body component, side body components and corner body components;
    four landing pads formed by an underside of the motor mounts covered on the bottom with a transparent lid to form a housing for downward-facing navigation lights;
    three motor arms coupled to each of the four motor mounts at 120-degree intervals, each providing equal structural support, with one motor arm extending upward to the center body component and two motor arms extending upward to a corner body component;
    four removable side body covers that fit over a top of an open space of the T-shaped side body components that when placed in their proper position create a compartment inside the side body components where electronics can be placed far enough from one another to minimize or prevent RF-interference while being protected from precipitation;
    four hinged arms secured to the underside of the center body component at each of four ends facing each other at 90 degree angles with openings for hook and loop fasteners and configured to flexibly secure battery backs;
    a removable translucent hood that provides protection to the flight controller and other vehicle electronics from precipitation while allowing LED indicators from the flight controller to be seen by a UAV operator;
    wherein the center body component, four side body components, four corner body components, four motor mounts, and twelve motor arms form a single uni-body.

2. An unmanned aerial vehicle (UAV), comprising:
    a uni-body frame
    a plurality of motors coupled to the uni-body frame; and
    a plurality of propellers, each propeller coupled to a motor of the plurality of motors, wherein the entire perimeter of each of the propellers is encompassed by the uni-body frame, wherein the uni-body frame comprises:
        a center body component configured to house a UAV flight controller, the center body component having mounting holes for securing batteries and payloads to the uni-body frame, the center body component forming a portion of an inner wall of four circles defined by the uni-body frame that provide protective enclosures for the plurality of propellers;
        four T-shaped side body components that are coupled to and extend from the center body component at 90-degree intervals from one another, wherein a stem of the T-Shape forms a portion of the inner wall of two of the four circles providing the protective enclosures for the plurality of propellers, and wherein an end of the T-shape is a straight line with a widening open space moving away from the stem, closed in on the bottom by a floor to form a tray;

four curved corner body components coupled to the side body components, the four curved corner body components forming a portion of an inner wall of one of the four circles providing a protective enclosure for the propellers;

four motor mounts positioned below the center body component, side body components and four corner body components arranged in an X-configuration; and four landing pads formed by an underside of the four motor mounts.

3. The unmanned aerial vehicle according to claim 2, further comprising three motor arms coupled to each of the four motor mounts at 120-degree intervals, with one motor arm extending upward to the center body component and two motor arms extending upward to a corner body component.

4. The unmanned aerial vehicle according to claim 2, wherein the uni-body further comprises four hinged arms secured to an underside of the center body component at each of four ends facing each other at 90 degree angles with openings for hook and loop fasteners and configured to flexibly secure battery backs.

5. The unmanned aerial vehicle according to claim 2, wherein the uni-body further comprises a mesh on the top connecting the two end-points of the curved components.

6. The unmanned aerial vehicle according to claim 2, wherein horizontal placement of the motor mounts falls exactly in a middle of the four circles created by coupling the center body component, side body components and corner body components.

7. The unmanned aerial vehicle according to claim 2, further comprising a transparent lid configured to cover an underside of the motor mounts to form a housing for navigation lights.

8. The unmanned aerial vehicle according to claim 2, wherein the uni-body further comprises four removable side body covers that fit over a top of an open space of the T-shaped side body components that when placed in their proper position create a compartment inside the side body components.

9. The unmanned aerial vehicle according to claim 2, wherein the uni-body further comprises a removable translucent hood configured to provide protection to the flight controller.

* * * * *